April 18, 1950        R. G. BAILEY        2,504,786
DISTRIBUTING DEVICE
Filed June 14, 1946
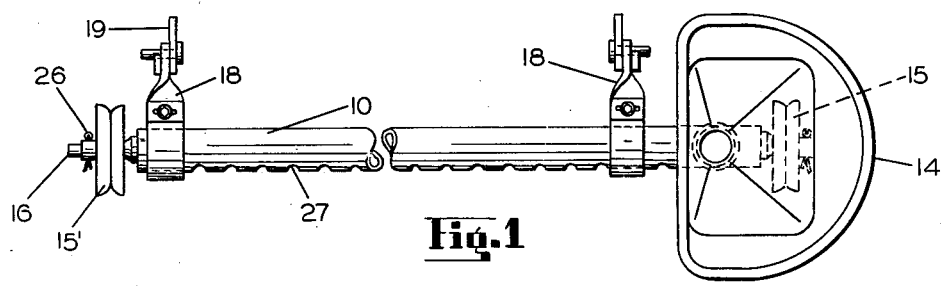
Fig.1
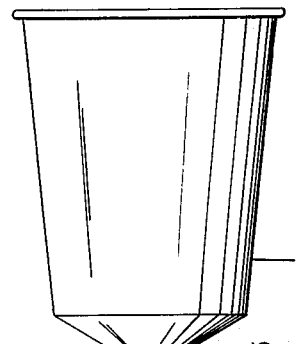
Fig.2
Fig.3
Fig.4
INVENTOR.
ROBERT G. BAILEY
BY
Christian R. Nielsen
ATTORNEY.

Patented Apr. 18, 1950

2,504,786

UNITED STATES PATENT OFFICE 2,504,786

DISTRIBUTING DEVICE

Robert G. Bailey, Kenosha, Wis., assignor of one-half to Carl E. Ballard, Kenosha, Wis.

Application June 14, 1946, Serial No. 676,695

1 Claim. (Cl. 275—2)

My invention relates to material distributors, and more particularly, to a distributor that may be used for seeds or fertilizers or the like.

The object of my invention is to provide a device that may be attached to a lawn mower without any mechanical adjustments, or may be constructed as a separate unit and may be operated as a separate unit for the distribution of seeds or fertilizers on a lawn or the like.

Another object to provide a device that will distribute seed or fertilizer evenly in a pre-determined path, will not feed when it is not in motion, and is positive in distributing a controlled amount of seeds, fertilizer or any other material.

Still another object of my invention is to construct a device in a manner that will permit its actuation by frictional contact with the surface being treated and will operate equally efficient on grades as well as straight surfaces.

A still further object of my invention is to construct the device so that it will distribute the material under pressure low down near the ground or surface, thereby preventing uncontrollable distribution due to wind or the like.

The device may be constructed at a nominal cost and is positive and efficient in its function.

Other and further objects of my invention will become more apparent as the description proceeds when taken in conjunction with the drawings, in which:

Figure 1 is a top or plan view of the entire device.

Figure 2 is an end view of the device, as shown in Figure 1, taken at the hopper end.

Figure 3 is a rear view of the device showing the spiral feed screw and tube in fragmentary cross-section, and Figure 4 is a perspective view of a modified attaching bracket.

Similar characters of reference indicate corresponding parts throughout the several views and referring now to the same, the device consists of a tubular body 10 having at one of its ends an upwardly extending member 11, shown in the form of a T. The open end of this T 11 is provided with a receiving member 12 adapted for receiving the lower ferrule 13 of a hopper arrangement 14. This hopper arrangement 14 may be provided with a cover, if desired, and may be constructed of any type of material suitable for the purpose.

The horizontal tubular body 10 is supported at both of its ends by annular members in the form of wheels 15 and 15'. These wheels also act as a bearing for a shaft 16 which acts as a supporting member and forms a part of a spiral screw 17 which rotates when the wheels 15 and 15' rotate. The entire device is attached to a lawn mower or the like, not shown, by means of the attaching members 18 which are shown in Figure 2 as provided with a link member 19 having an aperture 20 which would engage the outwardly projecting ends of the shaft supporting the roller on the lawn mower, and in Figure 4, I show the attaching member 18 as having a slidably adjustable jaw member 21 forming a part of the unit and attached and held in position by means of the thumb nut 22 engaging a bolt 23.

The ends of the tubular member 10 are provided with bearings 24 made of any suitable material such as wood or metal, and the ends of the shaft 16 are provided with a plurality of apertures 25 through which cotter pins 26 may be inserted and which retain the wheel members 15 and 15' in position on the shaft 16. The position of the spiral member or feed screw 17 which spiral member is shorter than the distance between the bearings 24 within the tubular member 10, due to longitudinal horizontal adjustment, can be made to feed little or much of the material which is dispensed from the hopper 14 by means of gravity through the ferrule 13 into the T member 11 of the tubular member 10. The adjustment of the feed screw 17 is accomplished by supporting the wheel members 15 and 15' at various locations by means of the cotter pins 26 inserted into the apertures 25. This tubular member 10 is also provided with a plurality of apertures 27 through which the material being distributed is fed. At the extreme end of the tubular member 10 are shown two larger apertures 28 disposed within the tubular member 10 and which function as an outlet for any material of a size larger than the apertures 27 which might be forced by the feed screw 17 toward the end of the tubular member 10.

It is also possible to attach a conventional handle of any design or shape to the members 18 and the links 19 which are employed for attaching to a lawn mower, not shown, may be eliminated and the entire device may be attached to any conventional handle at this point. This would make an individually operated unit that could be pushed or pulled by the operator over the surface in which the material is to be distributed.

Obviously, the size of the annular wheels 15 and 15' being of a small diameter would permit the apertures 27 of the tubular member 10 to be close to the surface that is being serviced and would prevent any waste of material being distributed.

It is manifest to anyone familiar with the art that a device constructed according to the specification and drawings shown, will function for the purpose for which it is intended. It is also manifest that the location of the hopper may be at either end or at the center of the device, in which case the spiral feed screw 17 would have a left and right spiral flange to feed toward either end. The device is constructed very simple, is economical to manufacture and is positive in its operation, and while I have shown but a single manner in which the component parts are arranged, I am fully cognizant of the fact that many changes in the form and configuration of the unit may be made without in any way affecting its efficiency, and I reserve the right to make such changes as I may deem necessary or convenient without departing from the spirit of my invention or the scope of the appended claim.

Having thus described my invention, what I claim and desire to secure by Letters Patent in the United States is:

A material dispensing device of the character described comprising a tubular body, said tubular body provided with bearings at both of its ends, a spiral feed screw disposed within said tubular body between said bearings the spiral portion in said screw being shorter than the distance between said bearings, a shaft extending through said spiral feed and extending outward through said bearings, said shaft provided with spaced apertures adjacent each shaft end, a pair of wheels said wheels arranged for slidable adjustment on said shaft, said spiral feed screw longitudinally adjustable within said tubular body, a hopper, said hopper disposed for engagement with the inside of said tubular member, said tubular member provided with a plurality of apertures within its walls, a plurality of larger apertures at the bottom of said tubular member near its depending end and means on both ends of said tubular body for attaching said tubular member to a lawn mower or the like to cause the revolving of the spiral feed screw by means of contact of the wheels with the surface to which the material is to be dispensed, said adjustment of said shaft regulating the amount of material deposited upon said spiral from said hopper.

ROBERT G. BAILEY.

REFERENCES CITED

The following references are of record in the file of this patent:

UNITED STATES PATENTS

| Number | Name | Date |
|---|---|---|
| 1,912,988 | Masters | June 6, 1933 |
| 2,417,624 | Altgelt | Mar. 8, 1947 |

FOREIGN PATENTS

| Number | Country | Date |
|---|---|---|
| 16,675 | Great Britain | Dec. 19, 1884 |
| 24,540 | Australia | Sept. 20, 1935 |